Dec. 6, 1955  P. W. FROMM  2,725,912
CUTTING MEANS FOR FORAGE HARVESTER
Filed March 1, 1954
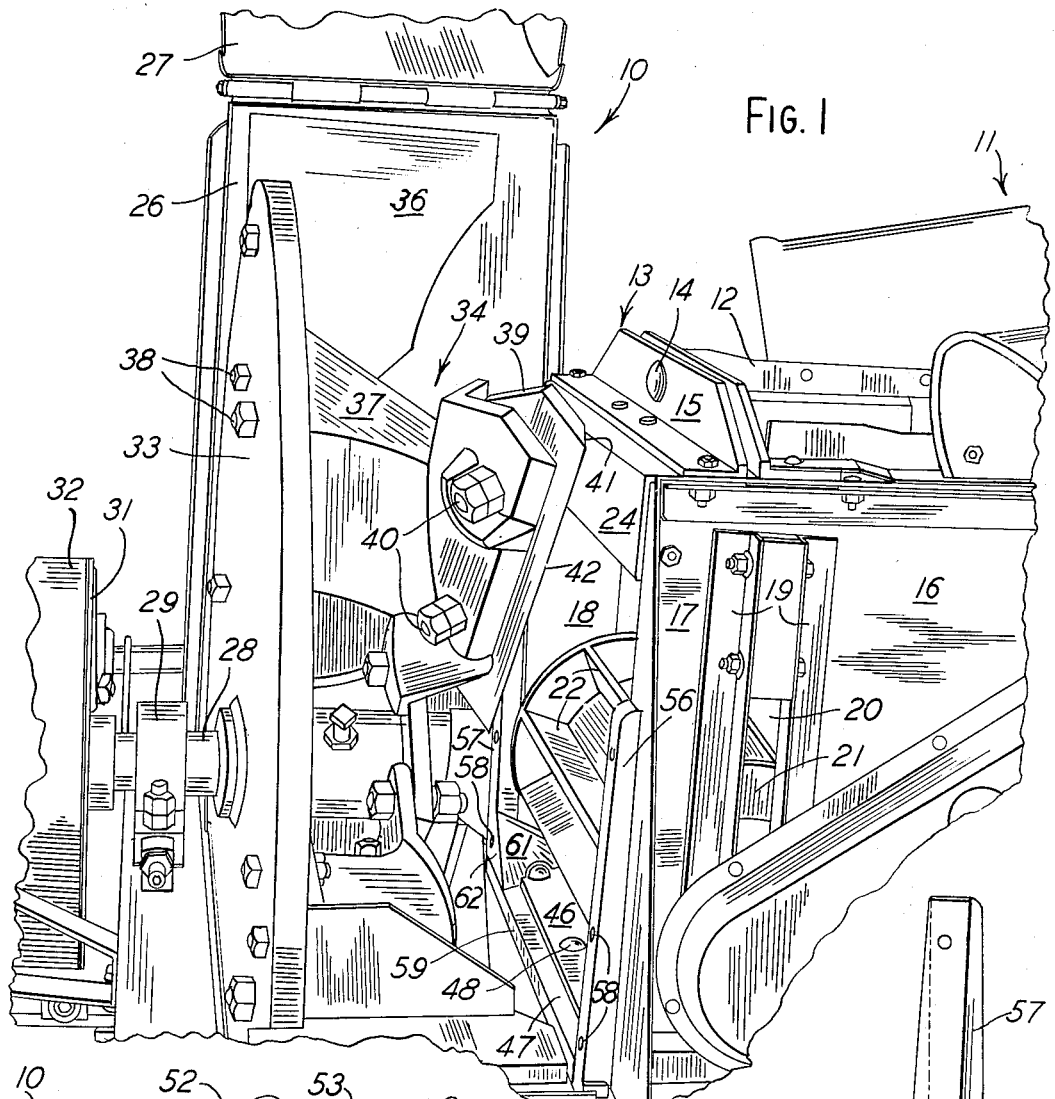
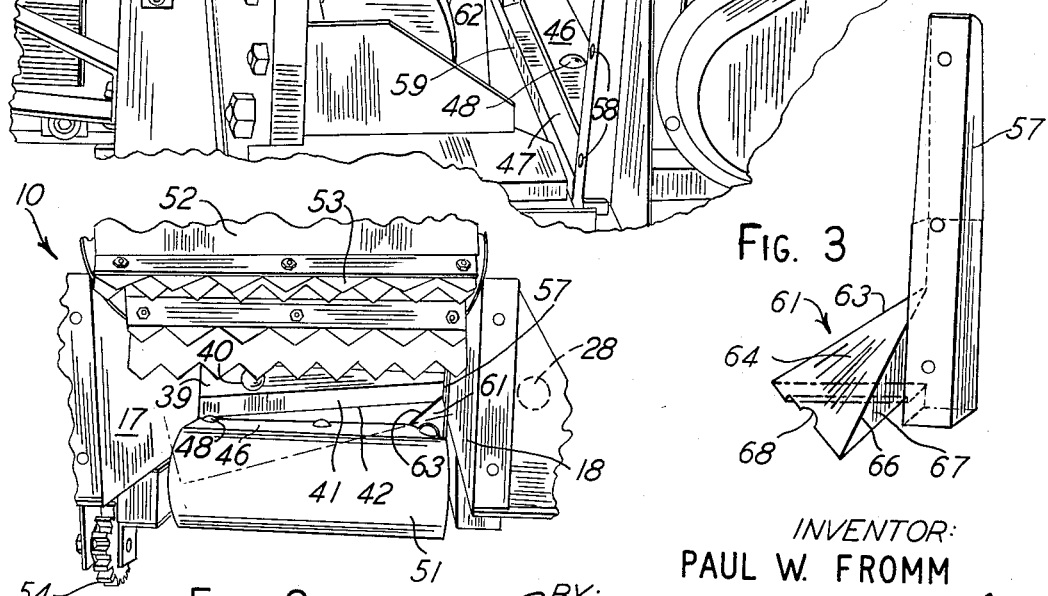
INVENTOR:
PAUL W. FROMM
BY: Emerson B Donnell
ATTORNEY

United States Patent Office 2,725,912
Patented Dec. 6, 1955

2,725,912

CUTTING MEANS FOR FORAGE HARVESTER

Paul W. Fromm, West Bend, Wis., assignor to J. I. Case Company, Racine, Wis.

Application March 1, 1954, Serial No. 413,070

4 Claims. (Cl. 146—108)

This invention relates to forage harvesters, and, more specifically, it relates to the forage cutting mechanism.

In the present type of forage harvesters, there is a common problem in cutting the forage material at the material feed throat or passageway corner nearest the cutter wheel shaft. The problem is that some of the material being fed through the harvester throat will go through improperly cut and some will be wound around the shaft of the cutter wheel, while other of the material will not be cut at all. Obviously, harvester performance of that nature not only results in inferior harvesting, but it also requires more power than what would otherwise be required, it is damaging to the operating parts, and causes the operator to interrupt his work to untangle the forage material wound around the shaft.

It is an object of this invention to provide a forage harvester cutting mechanism which will improve the forage cutting process.

Another object is to provide a forage harvester which will locate the material to be cut in a position nearer the center of the cutting blade where the linear speed of the blade is greater than the speed near the cutter wheel shaft.

Still another object of this invention is to provide a forage harvester cutting mechanism which changes the angle of shear between the cutter knife and a portion of the shear plate to improve the forage cutting performance.

Still an additional object is to provide a forage harvester cutting mechanism which will improve forage cutting performance without requiring any change in harvesters of an existing type other than substituting one part which is interchangeable with a conventional part of existing harvesters.

Other objects and advantages will be apparent upon reading the following description in conjunction with the accompanying drawings, in which, Fig. 1 is a fragmentary side perspective view of a forage harvester containing a preferred embodiment of this invention.

Fig. 2 is a fragmentary front perspective view of the harvester shown in Fig. 1 but with operating parts in a different position.

Fig. 3 is a side perspective view of a part shown in Fig. 1 but shown from a side approximately opposite from that shown in Fig. 1.

Similar reference numerals refer to similar parts throughout the three views.

For the purpose of a clear description of the invention, reference will be made to the rear of the harvester as that portion on the left side in Fig. 1, while the front of the harvester will be referred to as that on the right side. Also, the right side of the harvester is the near side in Fig. 1, and the left side will be the opposite or far side. This orientation is consistent with that assumed when facing in the normal direction of travel of a harvester.

Fig. 1 shows a forage harvester consisting of a base unit 10 with a forage pickup unit 11 shown attached to the front of the base unit in the usual manner. Actually, all that is shown of the pickup unit is the frame 12 which connects to the frame 13 of the base unit partly through the bolt 14 being affixed between the base unit top angle 15 of the frame 13 and the frame 12. Since the pickup unit can be of a conventional type, no further showing thereof will be necessary for a description of this invention. It should be understood that the pickup unit gathers material and passes it into the base unit 10 to be processed as hereinafter described. See U. S. Patent No. 2,661,585, December 8, 1953, Field Forage Harvester.

Suitably attached to the frame 13 is a pair of vertically disposed and spaced apart side sheets 16 with only the right side sheet shown in Fig. 1. Similarly positioned and spaced slightly to the rear of sheets 16 is a pair of right and left side angles 17 and 18. With all of the members 16, 17, and 18 mounted on the base unit, they define the vertical sides of the forage material passageway or throat. A pair of spaced angle irons 19 are attached one to the side 16 and one to the angle 17 to form a vertical slot 20 therebetween which receives the shaft (not shown) of an upper feed roller 21. The roller 21 is positioned across the feed throat to extend between the sides thereof and is preferably provided with a plurality of radial flutes 22. Thus, the feed roller 21 rotates to contact the top of the material and assist its travel rearwardly in the base unit. In this function, the roller is free to ride up and down in the slots 20 as the material forces it upwardly. It should be understood that the opposite or left side of the base unit is as shown and described in connection with the right side. The top rear end of the chamber terminates in a horizontal angle 24 which is attached to extend between the sides.

Suitably attached to the rear of the base unit 10 is a cutter and blower housing 26 shown with its side cover 27 in an open position for the purpose of viewing the interior. A base unit drive shaft 28 is rotatably mounted in a horizontal position in a bearing 29 which is mounted on the frame 13. As shown in Figs. 1 and 2, the shaft is offset from the throat. A pulley 31 is mounted on the rear end of the shaft 28 and both are rotated by a belt 32 which extends partially around the pulley. A wheel 33 is mounted on the shaft 28 to be non-rotatable with respect thereto and to be located within the housing 26. A series of cutters 34 and blower blades 36 are preferably bolted onto the front side of the wheel 33 to cut and blow forage through the housing in the operation of the forage harvester.

It should be noted that the cutters consist of mounting arms 37 which connect to the wheel by bolts 38 and which carry cutter blades 39 through attaching adjustment bolts 40. Also, there is a vertical cutting face 41 formed on the end of each of the blades 39 which terminates in a cutting edge 42 disposed substantially radially from the shaft 28.

Referring again to the feed passageway, it will be seen that the bottom thereof preferably consists of a material stripper plate 46 and a shear plate 47 positioned underneath and extended beyond the rear of the stripper plate. Both of the plates are suitably attached to the frame 13 by bolts 48 and are disposed horizontally. As shown in Fig. 2, a lower feed roller 51 is horizontally rotatably mounted between the sides defining the throat and forms part of the floor which is seen when looking into the throat. Here it will be noted that the stripper plate 46 extends forwardly to the proximity of the roller 51 to intercept the material from the roller. Also, rotatably mounted slightly forward and above the roller 51 is an intermediate feed roller 52 which is provided with radially projecting cleats 53 to grip the material and pass it along. The rollers mentioned are rotated in any conventional manner such as that shown in U. S. Patent No.

2,661,585. A gear 54, mounted on the side of the unit 10, provides a power transmission for the roller mentioned.

There is shown in Fig. 1 a cutter guide 56 and a cutter guide 57 respectively suitably bolted to the angle plates 17 and 18 by a plurality of counter-sunk bolts 58. The guide 57 is formed the same as the guide 56 except for the lower end thereof. Thus, the upper ends of both guides are tapered to be thinner at their tops and thereby assure that the cutter blade cutting edge 42 does not strike the guides as it rotates past the guides. Also, the rear base edges of the guides are formed and positioned to align with a rear edge 59 of the shear plate 47. It is, of course, the co-operation of the blade cutting edge 42 with the edge 59 which severs most of the material passing through the throat.

Arranged on the lower end of the guide 57 is a flared filler block or wedge 61 which is integral with the guide, in the embodiment shown, and serves as a shear plate. The wedge is preferably of a triangular shape which is completely offset from the longitudinal axis of the guide, as shown in Fig. 3. The back surface 62 of the block 61 is aligned with the back surface of the guide, and a sharpened inclined edge 63 forms one edge of the back side of the block and is referred to as an inward edge. An oblique flat front surface 64 is formed from the edge 63 to a second forwardly located edge 66 which is inclined rearwardly against the inside of the angle 18. The third side 67, of the triangular block, is aligned with the side of the angle 18. To permit access to and clearance for the bolt 48, a recess 68 is preferably provided in the block 61. Also, to accommodate the difference in elevation between the stripper plate 46 and the shear plate 47, the bottom surface of the block is accordingly formed to fit snugly over the tops of the plates as shown in Fig. 1.

With this arrangement, it should be understood that the material being fed through the feed throat will be urged over the inclined surface 64 toward the center of the throat. This positions the material at a point on the shear plate where the speed of the cutting blade is greater than the speed at the corner of the throat. Also, the material being fed through the throat is not permitted to go through the corner uncut and then be in the form which frequently wraps itself around the shaft or hub of the cutter wheel. The edge 63, of the wedge 61, is a shear plate edge, and, since it is inclined, as shown particularly in Fig. 2, it presents a better shear angle for the cutter blade to act upon. In connection with the last mentioned feature, the dot and dash line in Fig. 2 represents an advanced position of the cutter blade and indicates how the blade would force the forage material toward the shaft 28 when the wedge 61 is not provided. However, with the wedge, the material is forced away from the shaft to where the forage is cut nearer to the center of the feed throat and, correspondingly, the center of the blade. In this manner, there is provided a shear plate edge which is angular in its shape when viewed in a direction transverse to the plane of the path of the cutter blade.

A specific embodiment of this invention has been shown and described, however, the scope thereof should be limited only by the appended claims.

I claim:

1. In a forage harvester having a feed opening with a horizontal edge and a vertical edge, the combination comprising a cutter wheel rotating about an axis adjacent said feed opening, a stationary cutting knife on said horizontal edge, said wheel and said knife disposed to co-act during rotation of said cutter wheel to act on crop material progressively from the radial outer extremity of said wheel toward the inner extremity thereof to tend to force said material along said horizontal edge toward said vertical edge of said feed opening, a triangular filler block secured in the angle formed by said horizontal and vertical edges and having a stationary cutting knife aligned with said first stationary knife but forming an angle therewith disposed in a vertical plane to arrest movement of said crop material along said horizontal edge before said material reaches said vertical edge.

2. A forage harvester comprising a frame structure having a throat longitudinally disposed for the passage of forage material therethrough, a shear plate attached to said frame to form the bottom for said throat, a first shear plate edge located on the rear of said shear plate, a block attached to said frame to occupy a corner of said throat, a second shear edge located on the rear of said block at an angle to said first shear edge but aligned therewith, a shaft rotatably mounted on said frame to the side of said throat adjacent said block, a cutter blade attached to said shaft to rotate transverse to said throat adjacent said shear edges during rotation of said shaft, said blade and said first shear edge disposed to form an angle pointed away from said shaft to urge said forage material toward said shaft upon rotation of the latter, said second shear edge disposed to form with said blade an angle pointed toward said shaft to urge said crop material away from said shaft upon rotation of the latter.

3. A forage harvester comprising a frame defining a longitudinally disposed forage passageway, a shaft rotatably mounted in said frame parallel to but offset to one side of said passageway, a forage cutter blade mounted on said shaft and of sufficient length to extend completely across the end of said passageway, a shear plate attached to said frame to define the rear horizontal edge of said passageway, a second shear plate attached to said frame to be disposed within a section of said passageway adjacent said shaft, a rear shear edge on said second shear plate disposed at a vertical angle to said horizontal edge but aligned in the same vertical plane thereof.

4. A forage harvester comprising a frame having a throat disposed with a horizontal axis for the passage of forage material therethrough, a horizontal shear plate attached to said frame to define the rear bottom edge of said throat, a shaft rotatably mounted in said frame parallel to and to one side of said throat, a cutter blade attached to said shaft to rotate therewith and with said shaft and said blade arranged for the latter to sweep entirely across the rear end of said throat within a ninety degree angle of shaft rotation, a wedge attached to said frame to be positioned within a corner of said throat adjacent said shaft to urge said forage material toward the center of said throat as said material passes through said throat.

References Cited in the file of this patent

UNITED STATES PATENTS 2,457,951    Tuft ---------------- Jan. 4, 1949